United States Patent [19]

Gilmore et al.

[11] Patent Number: 5,608,814
[45] Date of Patent: Mar. 4, 1997

[54] METHOD OF DYNAMIC THRESHOLDING FOR FLAW DETECTION IN ULTRASONIC C-SCAN IMAGES

[75] Inventors: Robert S. Gilmore, Burnt Hills, N.Y.; Patrick J. Howard, Cincinnati, Ohio

[73] Assignee: General Electric Company, Schenectady, N.Y.

[21] Appl. No.: 341,470

[22] Filed: Nov. 17, 1994

Related U.S. Application Data

[63] Continuation of Ser. No. 118,337, Aug. 26, 1993, abandoned.

[51] Int. Cl.$^6$ ............................................. G06K 9/36
[52] U.S. Cl. ................................ 382/141; 382/270
[58] Field of Search ............................. 382/141, 190, 382/270–273, 261, 128; 73/602, 606, 607, 614, 620

[56] References Cited

U.S. PATENT DOCUMENTS

| | | | |
|---|---|---|---|
| 4,442,544 | 4/1984 | Moreland et al. | 382/53 |
| 4,468,704 | 8/1984 | Stoffel et al. | 382/53 |
| 4,501,016 | 2/1985 | Persoon et al. | 382/52 |
| 4,561,104 | 12/1985 | Martin | 382/8 |
| 4,751,846 | 6/1988 | Dousse | 73/602 |
| 4,809,349 | 2/1989 | Herby et al. | 382/50 |
| 4,823,194 | 4/1989 | Mishima et al. | 382/261 |
| 4,837,846 | 6/1989 | Oyabu | 382/50 |
| 4,869,109 | 9/1989 | Miglianico et al. | 73/620 |
| 4,887,306 | 12/1989 | Hwang et al. | 382/261 |
| 4,908,875 | 3/1990 | Assael et al. | 382/52 |
| 5,047,851 | 9/1991 | Sauerwein et al. | 382/8 |

OTHER PUBLICATIONS

Gonzalez et al. Digital Image Processing, Addison–Wesley Publishing Co. 1992, pp. 447–452.

Yanowitz et al. A new method for image segmentation, 9th Int. Conference of Pattern Recognition, IEE comput. Soc. Press, 1988, pp. 270–275.

*Primary Examiner*—Andrew Johns
*Attorney, Agent, or Firm*—David C. Goldman; Marvin Snyder

[57] ABSTRACT

The method of producing a binary flaw-no flaw image of an object, including employing an ultrasonic data acquisition system to obtain data values $f(i,j)$ which define a C-scan image (F) of the object, dividing the C-scan image (F) into a plurality of subimages ($G_k$ for $k=1,2,\ldots,K$), determining regional threshold levels $y(k)$ for each of the plurality of subimages, using said regional threshold levels $y(k)$ to determine pixel threshold levels $t(i,j)$ for each pixel $(i,j)$ of the image (F) by interpolation, and generating a binary flaw-no flaw image (B) by assigning binary values thereto based on a comparison between the pixel threshold levels $t(i,j)$ and data values $f(i,j)$, thereby providing a method which achieves a high probability of flaw detection and a low probability of false flaw indications.

16 Claims, 3 Drawing Sheets

METHOD OF DYNAMIC THRESHOLDING FOR FLAW DETECTION IN ULTRASONIC C-SCAN IMAGES

This application is Continuation of application Ser. No. 08/118,337, filed 26 Aug. 1993, now abandoned.

BACKGROUND OF THE INVENTION

The present invention relates to the field of image processing, and more particularly to a dynamic thresholding method for converting an ultrasonic C-scan image into a binary flaw-no flaw image.

Ultrasonic pulse-echo inspection of titanium and other large grain metal objects is plagued by grain noise produced by ultrasonic reflections from large grain interfaces. Grain noise occurs because the microstructure of metals such as titanium or the like can be coarse which causes the grains of the microstructure to return signals during a raster scan of the object with an ultrasonic transducer. Due to the extruding and forging processes used in forming titanium parts, grain structure, and therefore grain noise, can vary significantly between different regions of an object. Grain noise can typically vary between 6–20 dB. Grain noise can mask or conceal flaw indications in a defective region or produce false indications of flaws in defect free regions. False flaw indications can result in a defect free object being rejected for use in a particular application. Masked flaw indications can result in the unintentional use of a flawed part. Obviously, either masked flaw indications or false flaw indications can result in significant waste of time and materials in the manufacture of metal-parts and/or an undesirable increased risk of part failure.

BRIEF DESCRIPTION OF THE PRIOR ART

Previously in ultrasonic C-scan imaging, a technique known as global thresholding has been used to convert an ultrasonic inspection data into a flaw-no flaw decision. In the global thresholding technique, an initial calibration is performed which provides an estimate of grain noise which can be expected to occur in a particular object during the ultrasonic inspection. This initial estimation is based on a sample of grain noise in one particular region of the object. Based on this estimation, an alarm threshold or global threshold is set for the duration of the inspection. For example, a sample of the grain noise of an object may indicate that grain noise can be expected to occur up to a value of 40, wherein the value of 40 is proportional to the ultrasonic amplitude received by the ultrasonic transducer used in inspecting the object. From this estimate noise value, a global threshold value is set which is used to determine whether the signals received during inspection of the object are to be indicated as a flaw or no-flaw. If noise is estimated to occur up to a value of 40, and the threshold value is set at 40, any ultrasonic signal received having a value greater than 40 will be considered to indicate a flaw or defect in the object, while any signal received having a value less than 40 will be considered as noise and not a flaw. Thus, when ultrasonically scanning an object utilizing the global thresholding technique, a global threshold level is set once prior to scanning the object and this threshold level remains constant throughout the entire duration of the inspection.

A major disadvantage of global thresholding is that it does not take into account variations in grain noise levels which may exist between different regions of the object. Regardless of whether a region has high or low grain noise, the same threshold value is used in flaw-no flaw decision making in all regions of the object. As a result, global thresholding results in a high occurrence of masked flaw indications and/or false flaw indications when used for inspecting an object in which noise levels vary significantly in different regions of the object.

For example, if a high noise region is used in determining the global threshold level, flaws in a low noise region are masked by the high global threshold level, and therefore go undetected. Conversely, if a low noise region is used in determining the global threshold level;, defect free regions which have high noise levels will produce many false flaw indications.

SUMMARY OF THE INVENTION

A primary object of the present invention is to provide a method for converting an ultrasonic C-scan image into a binary flaw-no flaw image which enables a high probability of flaw detection and a low probability of false flaw indications.

A more specific object of the present invention is to provide a method for converting an ultrasonic C-scan image into a binary flaw-no flaw image which enables dynamic thresholding based on the particular characteristics of each region of an object.

A further object of the invention is to provide a method for converting an ultrasonic C-scan image into a binary flaw-no flaw image which maximizes the probability of detecting flaws and minimizes the probability of false flaw and minimizes the probability of false flaw indications in each region of the object.

Another object of the invention is to provide a method for converting an ultrasonic C-scan image into a binary flaw-no flaw image which takes into account particular characteristics of an associated data acquisition system used to obtain data values of the C-scan image.

Another object of the invention is to provide a method for producing a binary image from an ultrasonic C-scan of an object which enables a pixel threshold level to be obtained for each pixel data value of the C-scan image.

Yet another object of the invention is to provide method of ultrasonic scanning which enables a greater probability of flaw detection and less probability of false flaw indications than has heretofore been achieved with global thresholding methods.

A further object of the present invention is to provide a method of ultrasonic scanning of an object which insures continuity of pixel threshold levels at regional boundaries of a binary flaw-no flaw image of the object.

Still another object of the invention is to provide a method for generating a binary flaw-no flaw image from an ultrasonic C-scan image that enables threshold values to be dynamically determined for each pixel data value in the C-scan image based on grain noise present in each particular region of a scanned object.

These and other objects and advantages are achieved by the present invention by providing a method of producing a binary flaw-no flaw image of an object, which includes employing an ultrasonic data acquisition system to obtain data values $f(i,j)$ which define a C-scan image (F) of the object, dividing the C-scan image into a plurality of subimages $G_k$ for k=1,2, . . . ,K, determining regional threshold levels $y(k)$ for each of the plurality of subimages, using the regional threshold levels $y(k)$ to determine pixel threshold levels t(i,j) for each pixel (i,j) of the C-scan image, and generating a binary flaw-no flaw image (B) by assigning binary values thereto based on a comparison between the pixel threshold levels t(i,j) and data values f(i,j), respectively.

In accordance with one aspect of the invention, the step of determining the regional threshold levels includes initializing a first subimage $G_l$ with a region threshold level y(1), and determining for each of the subimages $G_k$, for k=2, . . . ,K, a regional threshold level as a function of the regional threshold level y(k−1) for subimage $G_{K−1}$.

A further aspect of the invention involves determining the regional threshold level as a function of at least one adjustment function which is defined based on the characteristic a data acquisition system. In accordance with this aspect of the invention, an upper and lower saturation point, wherein the values of the adjustment function above and below the upper and lower saturation points, respectively, remain constant.

In accordance with the present invention, determining the regional threshold levels further includes calculating an initial regional value for each subimage from the regional data values of each subimage, respectively, and inputting the initial regional value for each subimage to the adjustment function to obtain a first adjusted value for each subimage, respectively.

In a more particular embodiment of the invention, the initial data value may be the maximum, minimum, mean, median, standard deviation or some combination of the above of the data values in each region, respectively.

In accordance with a further aspect of the invention, calculation of the regional threshold levels for each subimage $G_k$ further includes subtracting the regional threshold level y(k−1) from the first adjusted value, to obtain a second adjusted value, operating on the second adjusted value with another adjustment function to obtain a third adjusted value, and adding the third adjusted value to the regional threshold level y(k−1) to obtain regional threshold level y(k).

According to a more particular object of the present invention, the method includes adjusting the regional threshold levels y(k) by averaging each of the regional threshold levels with regional threshold levels of subimages adjacent thereto, respectively.

A further aspect of the invention includes converting the regional threshold levels into pixel threshold levels for each pixel of the C-scan image using interpolation.

In accordance with another aspect of the invention, the binary flaw-no flaw image is produced by assigning for each pixel (i,j) of the binary flaw-no flaw image a binary pixel value indicating a flaw if the data value f(i,j) is greater than the pixel threshold level t(i,j), and a binary pixel value indicating no flaw otherwise.

BRIEF DESCRIPTION OF THE DRAWINGS

Other objects and advantages of the subject invention will become apparent from a study of the following specification when viewed in light of the accompanying drawings, in which.

DETAILED DESCRIPTION OF THE PREFERRED EMBODIMENT

Figure 1:
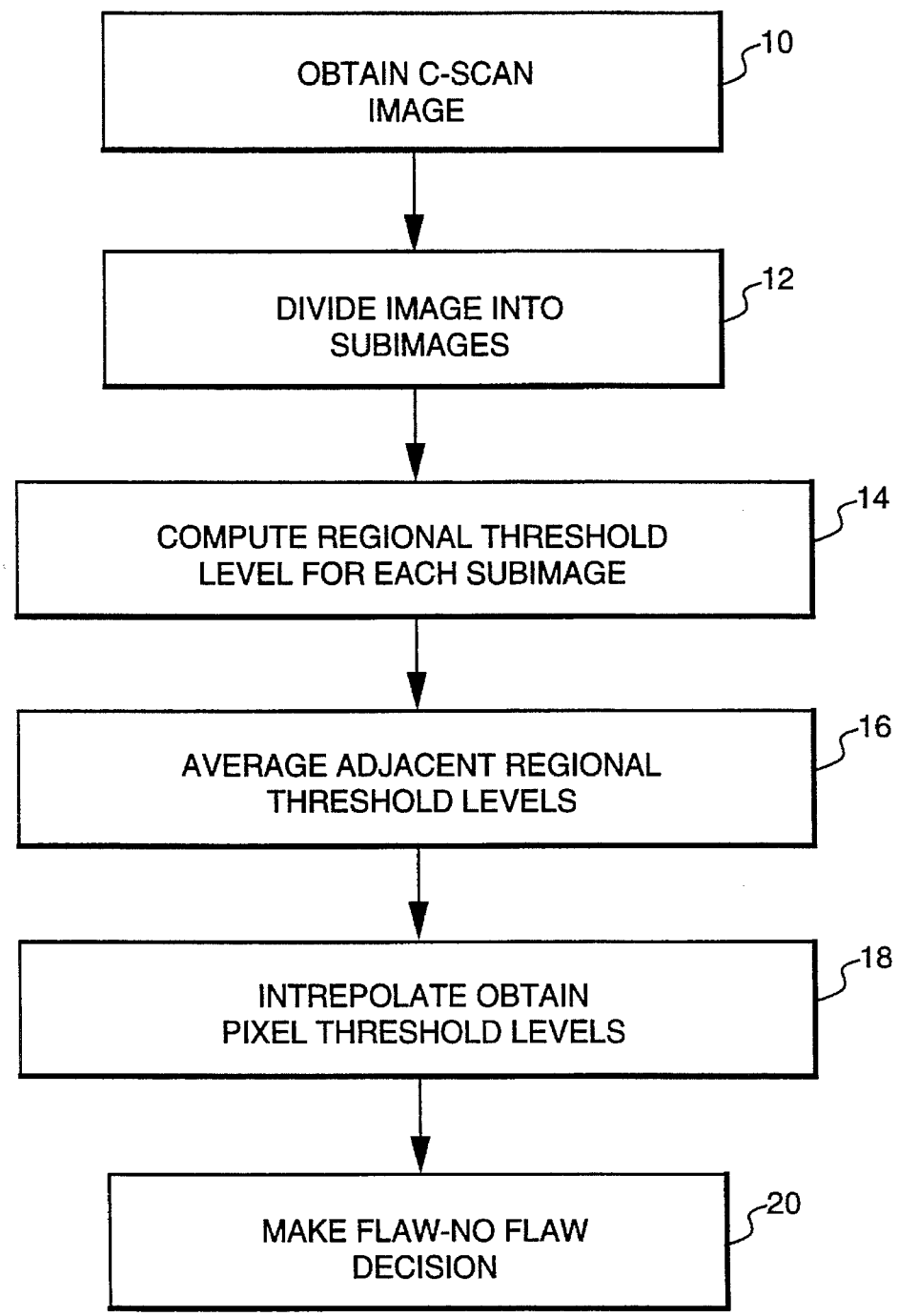
FIG. 1 is a flow chart of the steps which define the dynamic thresholding method of the present invention.

Referring now to FIG. 1, the first step 10 in the method of the present invention is to obtain a C-scan image F of an object using ultrasonic pulse-echo inspection. The present method has particular utility in the inspection of metal objects or manufactured parts made of large grain metals such as titanium or the like, to identify indications such as actual flaws in the metal, abnormally large grains, or any other indications which are identifiable over the grain noise in the part, such as hard alpha defects or the like.

Figure 2:
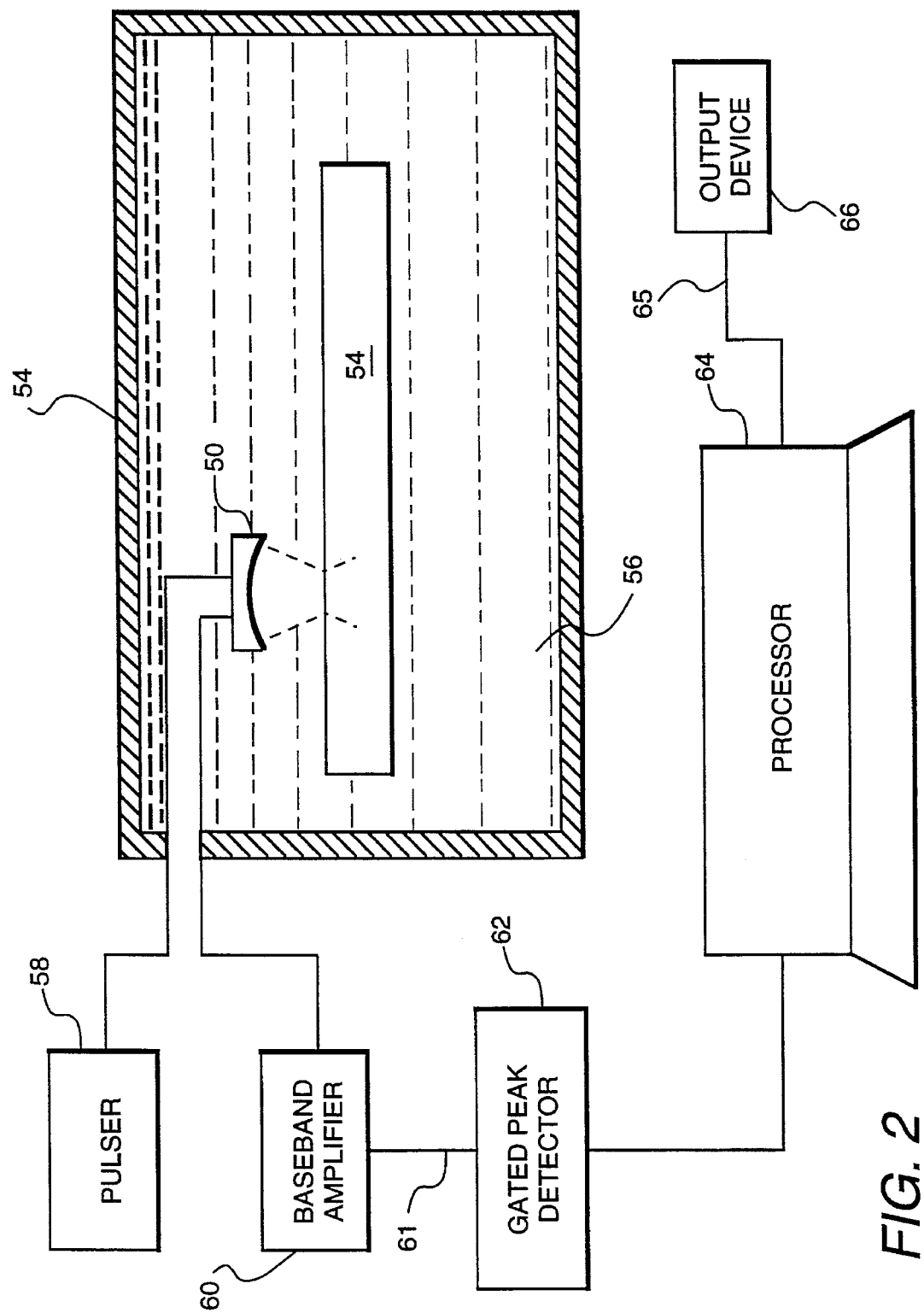
FIG. 2 depicts a preferred embodiment of the data acquisition system used in the method of the present invention.

As shown in FIG. 2, the C-scan image is obtained by a process known as C-scanning, wherein an ultrasonic transducer 50 is used to raster scan the part 52 with sound along a surface thereof. During the raster scan, the part 52 is immersed in a tank 54 full of couplant 56, such as water or the like. At each location (x,y) on the part 52 the ultrasonic transducer 50 is pulsed by pulser 58 to send a sound wave through the part 52 which reflects off or echoes back signals from the part to the transducer 50. A gate or time zone determines an area of interest over which data is going to be collected. A receiver 60 is provided to receive and amplify the echo signals and transmit the signals to a gated peak detector 62 via connection 61. Within the gate, the gated peak detector 62 is operable to output the maximum amplitude values of the signals received via line 63 to processor 64. The maximum amplitude values are then digitized and stored in a data processing processor 64, thereby defining a C-scan image of the object which may be outputted via connection line 65 to a suitable image viewing output device 66.

Thus in C-scanning, pixel data values f(i,j) are obtained for each pixel (i,j) of the C-scan image, thus defining a $M_1 \times M_2$ pixel image. The data processing device 64 includes image processing means which enables the pixel data values f(i,j) to be converted to binary flaw-no flaw values b(i,j) as will be described in detail below. Output device 66, such as a video monitor or printer, is provided to enable the binary flaw-no flaw image to be displayed or printed once generated. Inasmuch as C-scanning is well known in the art, particular details of C-scanning will not be further discussed herein.

Once the pixel data values f(i,j) are obtained for the $M_1 \times M_2$ C-scan image F, a dividing step 12 is performed which logically divides the image F into K subimages or regions of dimension $N_1 \times N_2$, denoted $G_k$, k=1, . . . ,K, wherein each subregion includes pixel data values g(i,j). For example, if a 2048×1024 pixel image F is used, the image may be broken down into 128 subimages each having 128×128 pixels therein. The size and shape of the subimages is a design parameter which can be selectively chosen relative to the size of the image to achieve a desired level of performance. Generally, the smaller the subimage, the smaller the indication which can be identified by the method of the present invention.

Preferably, the first subimage $G_1$ is defined in a corner of the image, and the remaining subimages $G_k$ for k=2, . . . ,K, are selected using a raster scanning convention, thereby defining the subimages in a manner which preserves the spatial correlation of the image.

Once the subimages are defined, a computing step 14 is performed which calculates a regional threshold level y(k) for each of the subimages $G_k$, using the following equations:

$$y(k)=y(k-1)+A_3(k) \quad (1)$$

$$A_3(k)=h_3(A_2(k)) \quad (2)$$

$$A_2(k) = A_1(k) - y(k-1) \tag{3}$$

$$A_1(k) = h_1(G_k) \tag{4}$$

wherein, $A_1(k)$ is a first adjusted value which is calculated from the pixel data values $g(i,j)$ in each subimage $G_k$ using the function denoted $h_1(\cdot)$ as shown in equation (4). Preferably, the first adjusted value is the mean plus some multiple of the standard deviation of the pixel data values $g(i,j)$ in each subimage, but depending on the particular application, the maximum, minimum, mean, median, or other suitable first adjusted value may be used. The choice of the first adjusted value is a design parameter which can be selectively chosen based on the type of metal used or indications one desires to identify.

A second adjusted value, $A_2(k)$ may then be calculated by subtracting from the first adjusted value $A_1(k)$ the preceding regional threshold level, $y(k-1)$ as shown in equation (3).

Figure 3:
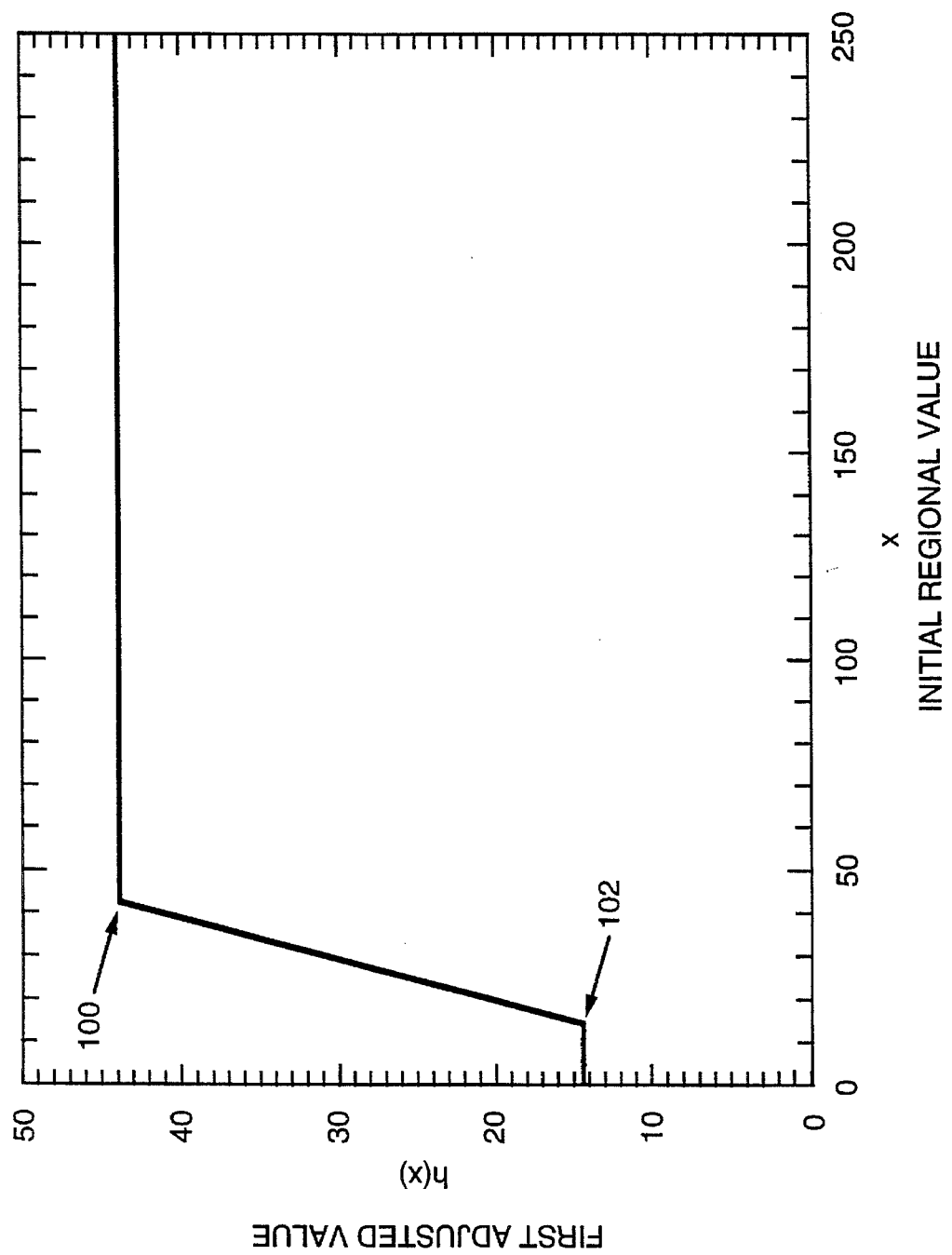
FIG. 3 is a graph of a preferred embodiment of the adjustment function used in the method of the present invention.

A third adjusted value, $A_3(k)$ can be calculated from the second adjusted value $A_2(k)$ using the function $h_3(\cdot)$ which is selectively chosen to match the particular characteristics of the data acquisition system used in C-scanning the object to obtain the pixel data values $f(i,j)$. A preferred embodiment of the function $h_3(\cdot)$ is shown in FIG. 3, which is particularly suited for use with data values collected from an 8-bit C-scan data acquisition system. As shown in FIG. 3, the functional $h_3(\cdot)$ is preferably a non-linear function which includes upper and lower saturation points 100 and 102, respectively, and is linear between the saturation points. The saturation points 100 and 102 operate to provide upper and lower limits for the third adjusted values of each subimage.

While the function $h_3(\cdot)$ of FIG. 3 represents a preferred embodiment of the adjustment function $h_3(\cdot)$, the saturation points 100 and 102 and/or the shape of the function $h_3(\cdot)$ may be different depending on the particular characteristics of the system in which the method is used. For example, the functional $h_3(\cdot)$ may be determined based on the type or dynamic range of the data acquisition system used, the amount of attenuation or gain which is applied to the ultrasonic signals, the length of the gate in the metal, and/or the size or type of indication to be identified. In other words, the particular adjustment function $h_3(\cdot)$ is a design parameter which can be selectively defined based on the particular inspection procedure and/or requirements of the application in which the present invention is used.

In addition to incorporating information about the data acquisition process, function $h_3(\cdot)$ is a weighting function which acts similar to a forgetting factor in an adaptive filter. The function $h_3(\cdot)$ determines the "memory" of the procedure by defining how to weight the information from the present subimage $G_k$ (contained in the second adjusted value, $A_2(k)$) relative to information from the previous subimage $G_{k-1}$ (contained in $y(k-1)$) in calculating the threshold level $y(k)$ for the present subimage $G_k$. Preferably, the function $h_3(\cdot)$ is a constant function such as $h_3(x) = 0.5 \times$ in the linear range, but any other suitable weighting function may be used. Thus, the function $h_3(\cdot)$ is a design parameter which can selectively be defined to adjust the performance of the present method.

As can be seen from equation (1), the regional threshold level $y(k)$ for subimage $G_k$ is determined by adding the third adjusted value, $A_3(k)$, to the previous regional threshold level $y(k-1)$ for subimage $G_{k-1}$. Maintaining consistency between the defining and numbering of the subimages and the spatial correlation of the object, as discussed above, enables the present method to take advantage of the invention present in a previous threshold level when calculating the next threshold level. Thus, equations (1)–(4) act like a moving weighted average in calculating the threshold levels for each region.

In order to enable initialization of the threshold procedure of equation (1), a threshold level $y(1)$ must be defined for subimage $G_1$. This can be achieved by using the value of the adjustment function $h_1(\cdot)$ corresponding to an initial regional value calculated from data values $g(i,j)$ in subregion $G_1$, or by any other suitable means which enables initialization of the procedure.

Once the regional threshold levels $y(k)$ are determined for each subimage $G_k$, an average step 16 is performed which neighborhood averages the regional threshold levels $y(k)$ into a new set of regional threshold levels $z(k)$ using an $l_1 \times l_2$ neighborhood $L_k$, as follows:

$$z(k) = \frac{1}{l_1 \cdot l_2} \sum_{y(j) \in L_k} y(j) \tag{5}$$

where $y(j) \in L_k$ is each of the $y(j)$'s included in $L_k$. The neighborhood averaging is performed to take into account the fact that the raster scanning convention used to define the subimages is causal, and noise correlation in C-scan images is typically non-causal. Since the procedure of equation 1 only takes into account information from subimages which are prior in time to the present subimage in calculating the regional threshold value of the present subimage, the neighborhood averaging enables the method to take into account all of the information near or around the present subimage, regardless of whether it is prior in time or not. For example, the neighborhood $L_k$ may be defined such that the regional threshold level $y(k)$ of subimage $G_k$ is averaged with all of the regional threshold levels of subimages which are directly adjacent to subimage $G_k$, thereby determining a new regional threshold level $z(k)$ for subimage $G_k$.

While the step of neighborhood averaging is preferably used in the present method, it is an optional step which, when used, can provide a higher probability of flaw detection and/or a less probability of false flaw indication in some applications. However, it has been found that neighborhood averaging may have only a small or negligible effect on flaw identification in some applications. Thus, in certain applications the neighborhood averaging step can be eliminated to simplify the present method.

Once the regional threshold levels $y(k)$ or $z(k)$ are determined, an interpolation step 18 is performed in which pixel threshold values $t(i,j)$ are computed for each pixel $(i,j)$ of the image F from the regional threshold values using interpolation. The interpolation step is performed to ensure continuity between subimage boundaries by smoothing the threshold levels out between the regions, thereby eliminating the occurrence of large differences in the threshold levels between adjacent pixels at the boundaries of subimages. Preferably, linear interpolation is used to determine the pixel threshold levels $t(i,j)$.

Once pixel threshold levels $t(i,j)$ are determined, the final step of the present invention is a decision step 20 in which binary values $b(i,j)$ are determined which define a binary flaw-no flaw image B based on a comparison between the pixel data values $f(i,j)$ and the pixel threshold values $t(i,j)$. Thus resulting in $M_1 \times M_2$ binary data values which make up the flaw-no flaw image B. For example, the binary values $b(i,j)$ may be determined as follows:

$$b(i,j) = \left\{ \begin{array}{l} 1 \text{ if } f(i,j) > t(i,j) \\ 0 \text{ otherwise} \end{array} \right\} \tag{6}$$

Thus, a binary value of 1 would identify an indication such as a flaw or a large grain in the metal at the corresponding location thereon, and a binary value of 0 would indicate that no flaw in the metal exists at that particular location.

In accordance with the invention, the particular criteria for selecting the binary values in equation (6) may vary depending on the particular application. For example, in some application a binary value of 1 may be selected if the data value f(i,j) is greater than, rather than greater than or equal to the pixel threshold values t(i,j). Conversely, in some data acquisition systems in which the present method could be employed, it may be desirable to identify an indication if the pixel data value f(i,j) is below, rather than above the corresponding pixel threshold value t(i,j).

Thus, the present invention provides a flexible and reliable method for generating a binary flaw-no flaw image from an ultrasonic C-scan image that enables threshold values to be dynamically determined for each pixel data value in the C-scan image based on grain noise present in each particular region of a scanned object.

As can be seen from the foregoing description, the present method provides an increased probability of flaw detection and a decreased probability of false flaw indications compared to that which has heretofore been achieved with global thresholding techniques.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed is:

1. A method of producing a binary image of an object, the image showing any regions of flaws in the object and any regions in the object without flaws, the method comprising the steps of:

ultrasonically scanning an object with sound wave energy;

detecting echo signals reflected from the object;

determining data values f(i,j) from said echo signals which define a C-scan image of the object scanned;

dividing the C-scan image into a plurality of subimages ($G_k$) for k=1,2,...,K, wherein each subimage includes regional data values g(i,j);

calculating an initial region value for each subimage from the regional data values g(i,j) of each subimage, the calculation of the initial regional value includes determining a maximum data value of the regional data value g(i,j) of each subimage, and using the maximum data value as the initial regional value for each subimage, respectively;

using the initial regional values to dynamically determine regional threshold levels y(k) for each of the plurality of subimages, the regional threshold levels for each of the plurality of subimages being dependent on regional threshold levels in adjacent subimages, the regional threshold levels for each of the plurality of subimages determined from the initial region value in each subimage and initial region values in adjacent subimages, determining said regional threshold levels further includes determining said regional threshold levels as a function of at least one adjustment function which is defined based on characteristics of a data acquisition system used for ultrasonic scanning the object and detecting signals therefrom, determining said regional threshold levels for each subimage $G_k$ further includes subtracting a regional threshold level y(k–1) from a first adjusted value derived from an adjustment function, to obtain a second adjusted value, operating on said second adjusted value by another adjustment function to obtain a third adjusted value, and adding said third adjusted value to the regional threshold level y(k–1) to obtain the regional threshold level y(k);

using said regional threshold levels y(k) to dynamically determine pixel threshold levels t(i,j) for each pixel (i,j) of said C-scan image, the pixel threshold levels being dependent on pixel threshold levels in adjacent subimages;

comparing said pixel threshold levels t(i,j) to said data values f(i,j), respectively;

assigning binary values to said compared data values, the binary values being indicative of flaws and non-flaws; and generating a binary image of the object, the image showing any regions of flaws in the object and any regions in the object without flaws.

2. The method as defined in claim 1, wherein said step of calculating an initial regional value includes calculating a mean value of the regional data values g(i,j) of each subimage, and using said mean value as the initial regional value for each subimage, respectively.

3. The method as defined in claim 1, wherein said step of calculating an initial regional value includes calculating a mean plus a multiple of the standard deviation of the regional data values g(i,j) of each subimage, and using said quantity as the initial regional value for each subimage, respectively.

4. The method as defined in claim 1, wherein said step of calculating an initial regional value includes calculating a median value of the regional data values g(i,j) of each subimage, and using said median value as the initial regional value for each subimage, respectively.

5. The method as defined in claim 1, wherein said step of calculating an initial regional value includes determining a minimum value of the regional data values g(i,j) of each subimage, and using said minimum value as the initial regional value for each subimage, respectively.

6. The method as defined in claim 1, wherein the step of determining said regional threshold levels as a function of at least one adjustment function includes using adjustment functions which includes upper and lower saturation points, wherein the values of said adjustment functions above and below said upper and lower saturation points, respectively, remain constant.

7. The method as defined in claim 6 further including the step of defining said adjustment functions to be linear between said upper and lower saturation points.

8. The method as defined in claim 1, further including the step of adjusting said regional threshold levels y(k) after the step of determining, by averaging each of said regional threshold levels with regional threshold levels of subimages adjacent thereto, respectively.

9. The method as defined in claim 8, further including the step of converting said averaged regional threshold levels into pixel threshold levels for each pixel of the C-scan image.

10. The method as defined in claim 9 wherein the step of converting said averaged regional threshold levels into pixel threshold levels includes interpolating said averaged regional threshold levels to obtain the pixel threshold levels.

11. The method as defined in claim 1, wherein the step of using includes converting said regional threshold levels into pixel threshold levels for each pixel of the C-scan image.

12. The method as defined in claim 11, wherein the step of converting said regional threshold levels into pixel threshold levels includes interpolating said regional threshold levels to obtain the pixel threshold levels.

13. The method as defined in claim 11, wherein the step of converting said regional threshold levels into pixel threshold levels includes linearly interpolating said regional threshold levels to obtain the pixel threshold levels.

14. The method as defined in claim 13, wherein the step of generating a binary image includes assigning foe each pixel (i,j) of the binary image a binary pixel value indicating a flaw if the data value f(i,j) is greater than the pixel threshold level t(i,j), and a binary pixel value indicating no flaw otherwise.

15. The method as defined in claim 11, wherein the step of generating a binary image includes assigning for each pixel (i,j) of the binary image a binary pixel value indicating a flaw if the data value f(i,j) is greater than the pixel threshold level t(i,j), and a binary pixel value indicating no flaw otherwise.

16. The method as defined in claim 1, wherein the step of generating a binary image includes assigning foe each pixel (i,j) of the binary image a binary pixel value indicating a flaw if the data value f(i,j) is greater than the pixel threshold level t(i,j), and a binary pixel value indicating no flaw otherwise.

* * * * *